Patented Nov. 6, 1923.

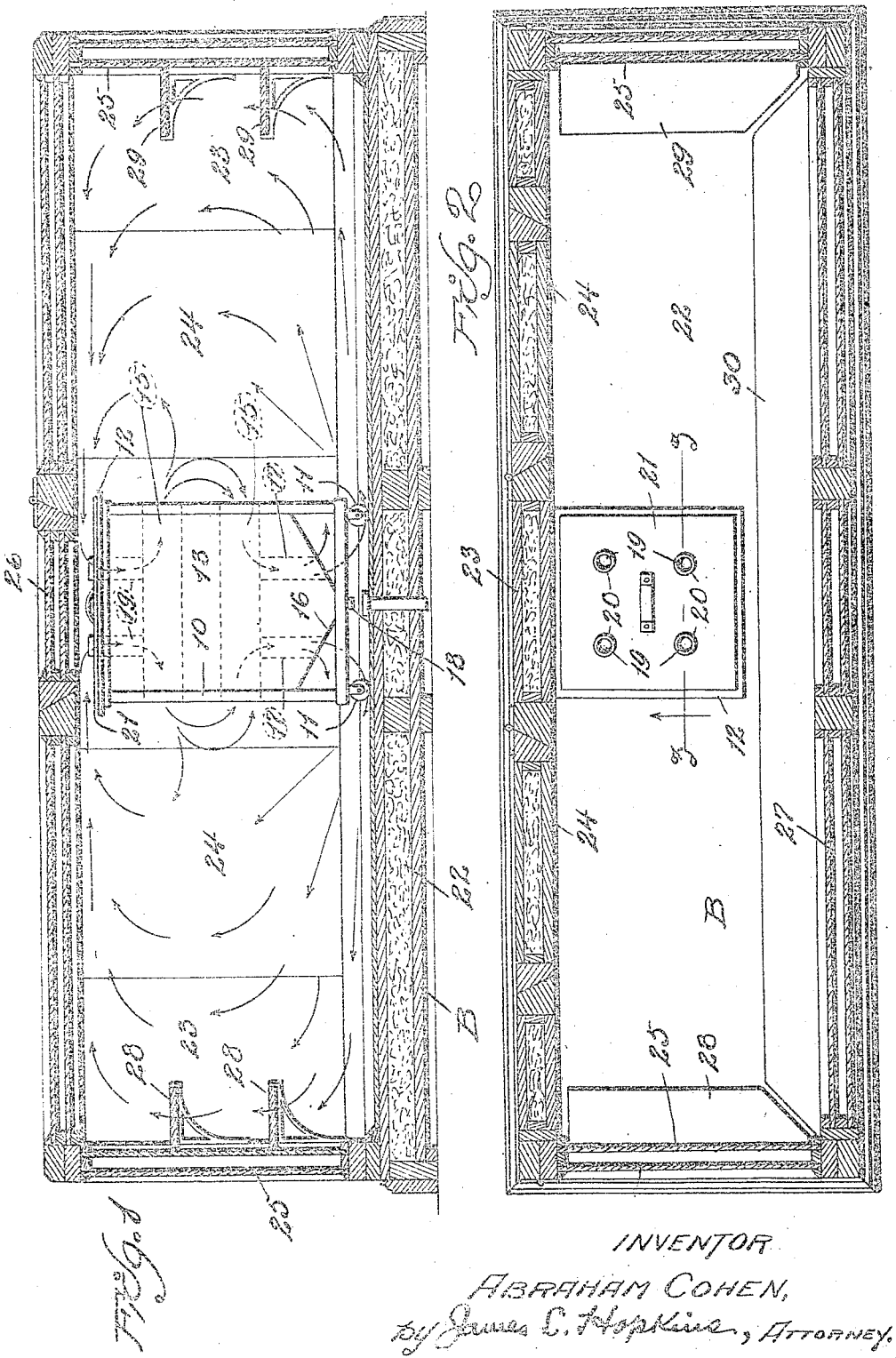

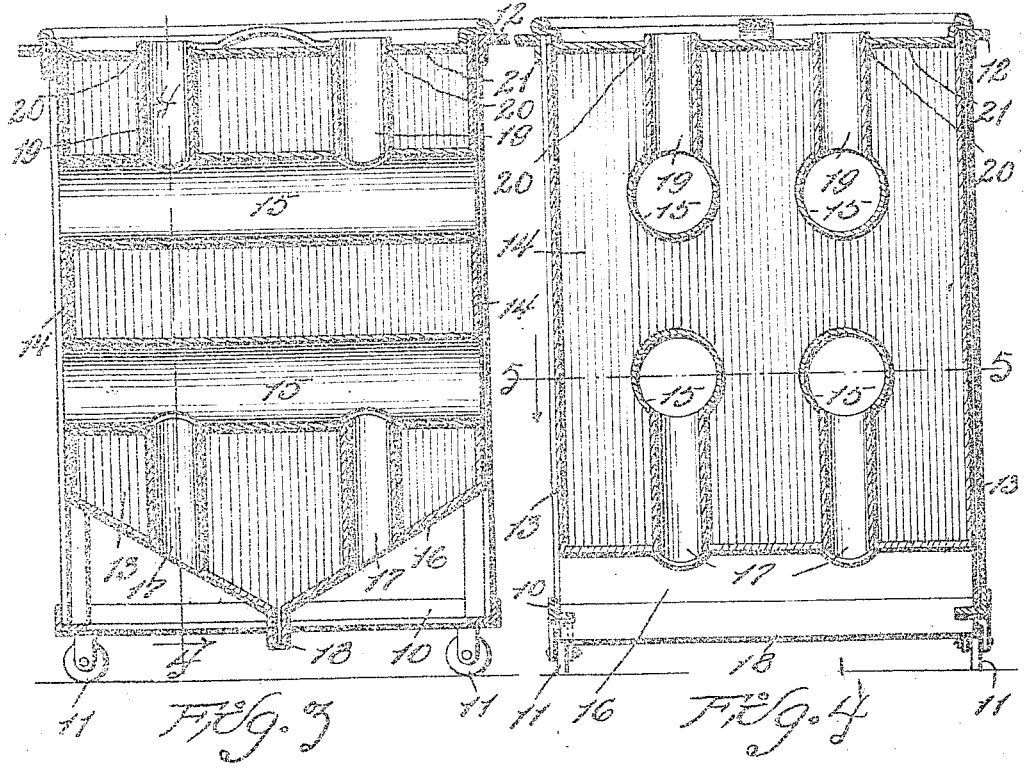
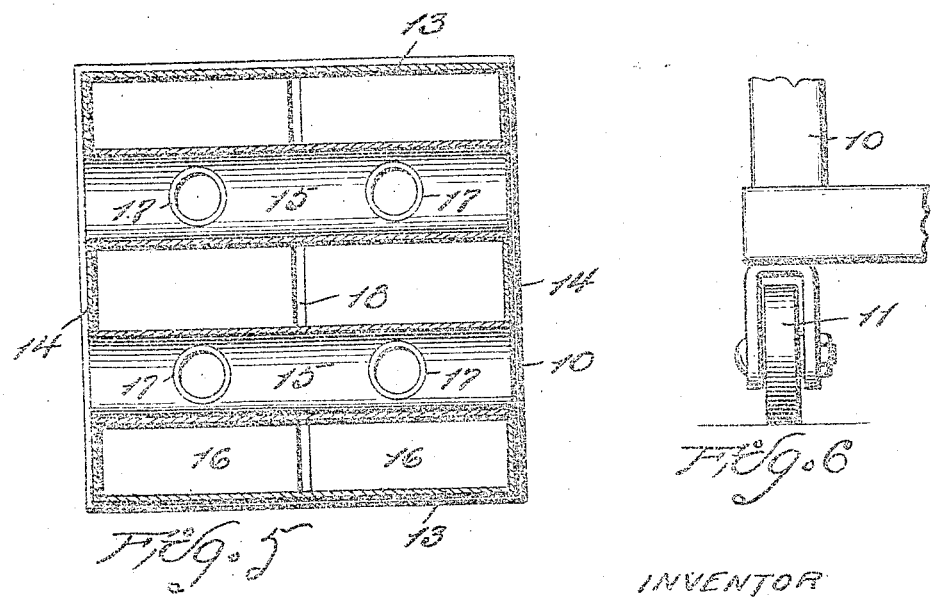

1,473,014

UNITED STATES PATENT OFFICE.

ABRAHAM COHEN, OF ST. LOUIS, MISSOURI

SHOWCASE REFRIGERATOR.

Application filed November 16, 1921. Serial No. 516,119.

*To all whom it may concern:*

Be it known that I, ABRAHAM COHEN, a citizen of the United States, residing at St. Louis, State of Missouri, have invented certain new and useful Improvements in Showcase Refrigerators, of which the following is a specification, reference being had therein to the accompanying drawings.

My invention relates to improvements in showcase refrigerators, and has for its object to provide a portable refrigerating unit having horizontal and vertical draft tubes, and arranged for use in various positions within a show-case or other elongated container, to the end of locating the refrigerating unit in proximity to the contents of the container requiring the lowest temperature. In the use of my invention the merchandise to be refrigerated is of various degrees of perishability ranging from fresh meats or sea-food to smoked meats, other cooked or processed food-stuffs, or canned goods, or bottled beverages, and the relative quantities of these several kinds of goods may change from day to day, or hour to hour. Hence the purpose of shifting the refrigerating unit to close proximity to the more perishable goods in the storage container. Other purposes and advantages inherent in the use of my invention will appear from the appended detailed description.

Drawings.

Fig. 1 is a longitudinal vertical sectional view of an apparatus embodying my invention.

Fig. 2 is a longitudinal view of the same in cross-section, embodying a top plan view of the refrigerating unit with its cover in place.

Fig. 3 is a vertical sectional view of the refrigerating unit taken on the line 3—3 of Fig. 2.

Fig. 4 is a similar view of that unit, taken on the line 4—4 of Fig. 3.

Fig. 5 is a horizontal sectional view of the refrigerating unit, taken on the line 5—5 of Fig. 4.

Fig. 6 is an enlarged fragmental view of one corner of the refrigerator unit frame with its supporting roller.

Description.

The refrigerating unit employed in my invention comprises a rectangular frame 10 supported by rollers 11 and having a flange 12 around its top. Carried by the frame 10 is the housing comprising imperforate front and rear walls 13, and side walls 14 through which horizontal pipes 15 extend, and a V-shaped bottom 16 through which vertical pipes 17—17 extend, and which terminates at its bottom in the slotted drainage mouth 18.

The pipes 15 are preferably arranged in upper and lower pairs or series as shown, the lower series receiving the upper mouths of the pipes 17, and the upper series communicating with the inlet-pipes 19, which pipes 19 extend vertically as shown through apertures 20 in the lid 21.

Obviously the icing-unit thus described may be used in a room, box or case adapted for storage and refrigeration. I have illustrated a show-case B having an insulated bottom 22, and an insulated rear-wall 23 provided with doors 24; glazed doors 25 forming the ends of the show-case B and permitting the refrigerating unit to be introduced or withdrawn at either end of the show-case B; a top-door 26 through which the refrigerating unit may be iced, and a glazed front-wall 27.

The doors 25 are provided with shelves 28 and 29, and other shelves 30 are fixed within the front-wall 27. Should the shelf 29 and the adjacent end of the show-case B be supplied with readily perishable contents, while the opposite end of said showcase, adjacent to shelf 28 contains less perishable contents, the refrigerating unit would be moved toward the shelf 29. Or the refrigerating unit being centrally located as in Figs. 1 and 2 the more delicate and perishable contents could be placed for display purposes on that portion of the shelf 30 immediately in front of the refrigerating unit. That unit may be charged with its proper contents (ice and salt, or the like) while beneath the door 26, or it may be rolled out of either end of the show-case B for that purpose, and for the purpose of being cleansed.

The arrangement of the pipes 15, 17 and 19 facilitates the circulation of air in whatever relative location the refrigerating unit may be placed, and in Fig. 1 I have illustrated by arrows the air-currents as they may exist when the atmospheric content of the case B is not disturbed by external influences (such as exist when either of the doors 24, 25 or 26 is opened). It is intended that the top and warmest stratum of air shall at all times maintain a downward movement through the pipes 19 into the pipes 15 (upper series) and outwardly therethrough. The circulation through the lower series of pipes 15 and the pipes 17 will naturally, and without external disturbance, follow the arrow—indications in Fig. 1. So that at all times the central air content of the pipes 15 (between the openings of the vertical pipes 17 and 19) will be substantially at rest.

I claim:

The portable refrigerating unit comprising a wheeled frame and a housing carried by said frame; said housing having upper and lower sets of horizontal tubes, a set of vertical tubes extending from the upper set of horizontal tubes to the exterior of the housing, the housing having a lid apertured to receive said set of vertical tubes, and a lower set of vertical tubes extending from the lower set of horizontal tubes through the bottom of said housing; said bottom being V-shaped and terminating in a slotted drainage mouth.

In testimony whereof I hereunto affix my signature.

ABRAHAM COHEN.